US008791905B2

(12) United States Patent
Elizarov et al.

(10) Patent No.: US 8,791,905 B2
(45) Date of Patent: **\*Jul. 29, 2014**

(54) HANDHELD ELECTRONIC DEVICE AND METHOD FOR DUAL-MODE DISAMBIGUATION OF TEXT INPUT

(71) Applicant: Research In Motion Limited, Waterloo (CA)

(72) Inventors: Micahael Elizarov, Waterloo (CA); Vadim Fux, Waterloo (CA); Dan Rubanovich, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/718,293

(22) Filed: Dec. 18, 2012

(65) Prior Publication Data

US 2013/0106705 A1    May 2, 2013

Related U.S. Application Data

(63) Continuation of application No. 13/206,834, filed on Aug. 10, 2011, now Pat. No. 8,390,574, which is a continuation of application No. 12/911,251, filed on Oct. 25, 2010, now Pat. No. 8,018,355, which is a continuation of application No. 12/346,116, filed on Dec. 30, 2008, now Pat. No. 7,843,364, which is a continuation of application No. 11/427,946, filed on Jun. 30, 2006, now Pat. No. 7,586,423.

(51) Int. Cl.
*G09G 5/00* (2006.01)
*G06F 3/02* (2006.01)

(52) U.S. Cl.
USPC .................. 345/169; 345/156; 345/168

(58) Field of Classification Search
USPC .......................... 345/156, 168, 169
See application file for complete search history.

(56) References Cited

U.S. PATENT DOCUMENTS

| 6,286,064 | B1 * | 9/2001 | King et al. ............. 710/67 |
| 6,307,548 | B1 * | 10/2001 | Flinchem et al. ............. 715/811 |
| 6,356,258 | B1 * | 3/2002 | Kato et al. ............. 345/168 |
| 7,312,726 | B2 * | 12/2007 | Fux et al. ............. 341/22 |
| 7,358,866 | B2 * | 4/2008 | Fux et al. ............. 341/22 |
| 7,586,423 | B2 * | 9/2009 | Elizarov et al. ............. 341/22 |
| 7,626,574 | B2 * | 12/2009 | Kim ............. 345/168 |
| 7,843,364 | B2 * | 11/2010 | Elizarov et al. ............. 341/22 |
| 7,969,329 | B2 * | 6/2011 | Fux et al. ............. 341/22 |
| 8,018,355 | B2 * | 9/2011 | Elizarov et al. ............. 341/22 |
| 8,188,978 | B2 * | 5/2012 | Fux et al. ............. 345/169 |
| 8,250,487 | B2 * | 8/2012 | Chae ............. 715/830 |

(Continued)

*Primary Examiner* — Hai Phan
*Assistant Examiner* — Amine Benlagsir
(74) *Attorney, Agent, or Firm* — Finnegan, Henderson, Farabow, Garrett & Dunner LLP

(57) ABSTRACT

A handheld electronic device includes a reduced QWERTY keyboard and is enabled with disambiguation software that is operable to disambiguate text input. In response to an ambiguous editing input at a location preceding at least a portion of an output word, the software performs one disambiguation operation with respect to the editing input and another disambiguation operation with respect to the editing input in combination with the at least portion of the output word. The results are output in order of decreasing frequency value, with the results of the one disambiguation operation having the portion of the output word appended thereto.

9 Claims, 7 Drawing Sheets

(56) References Cited

U.S. PATENT DOCUMENTS

| | | | |
|---|---|---|---|
| 8,299,943 B2 * | 10/2012 | Longe | 341/22 |
| 8,365,071 B2 * | 1/2013 | Fux et al. | 715/262 |
| 2006/0007121 A1 * | 1/2006 | Fux et al. | 345/156 |
| 2006/0047244 A1 * | 3/2006 | Fux et al. | 604/74 |
| 2007/0188472 A1 * | 8/2007 | Ghassabian | 345/169 |
| 2007/0195063 A1 * | 8/2007 | Wagner et al. | 345/169 |

* cited by examiner

HANDHELD ELECTRONIC DEVICE AND METHOD FOR DUAL-MODE DISAMBIGUATION OF TEXT INPUT

CROSS-REFERENCE TO RELATED APPLICATION

The instant application is a continuation application of U.S. patent application Ser. No. 13/206,834 filed Aug. 10, 2011, which is a continuation application of U.S. patent application Ser. No. 12/911,251 filed Oct. 25, 2010, now U.S. Pat. No. 8,018,355, which is a continuation application of U.S. patent application Ser. No. 12/346,116 filed Dec. 30, 2008, now U.S. Pat. No. 7,843,364, which is a continuation application of U.S. patent application Ser. No. 11/427,946 filed Jun. 30, 2006, now U.S. Pat. No. 7,586,423, the disclosures of all of which are incorporated herein by reference.

BACKGROUND

1. Field

The disclosed and claimed concept relates generally to handheld electronic devices and, more particularly, to a handheld electronic device having a reduced keyboard and a text input disambiguation function that can dual-mode disambiguation in response to an editing input.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Latin alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keyboards have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. Another keystroke interpretation system that has been employed is a software-based text disambiguation function. In such a system, a user typically presses keys to which one or more characters have been assigned, generally pressing each key one time for each desired letter, and the disambiguation software attempts to predict the intended input. Numerous such systems have been proposed, and while many have been generally effective for their intended purposes, shortcomings still exist.

It would be desirable to provide an improved handheld electronic device with a reduced keyboard that seeks to mimic a QWERTY keyboard experience or other particular keyboard experience. Such an improved handheld electronic device might also desirably be configured with enough features to enable text entry and other tasks with relative ease.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
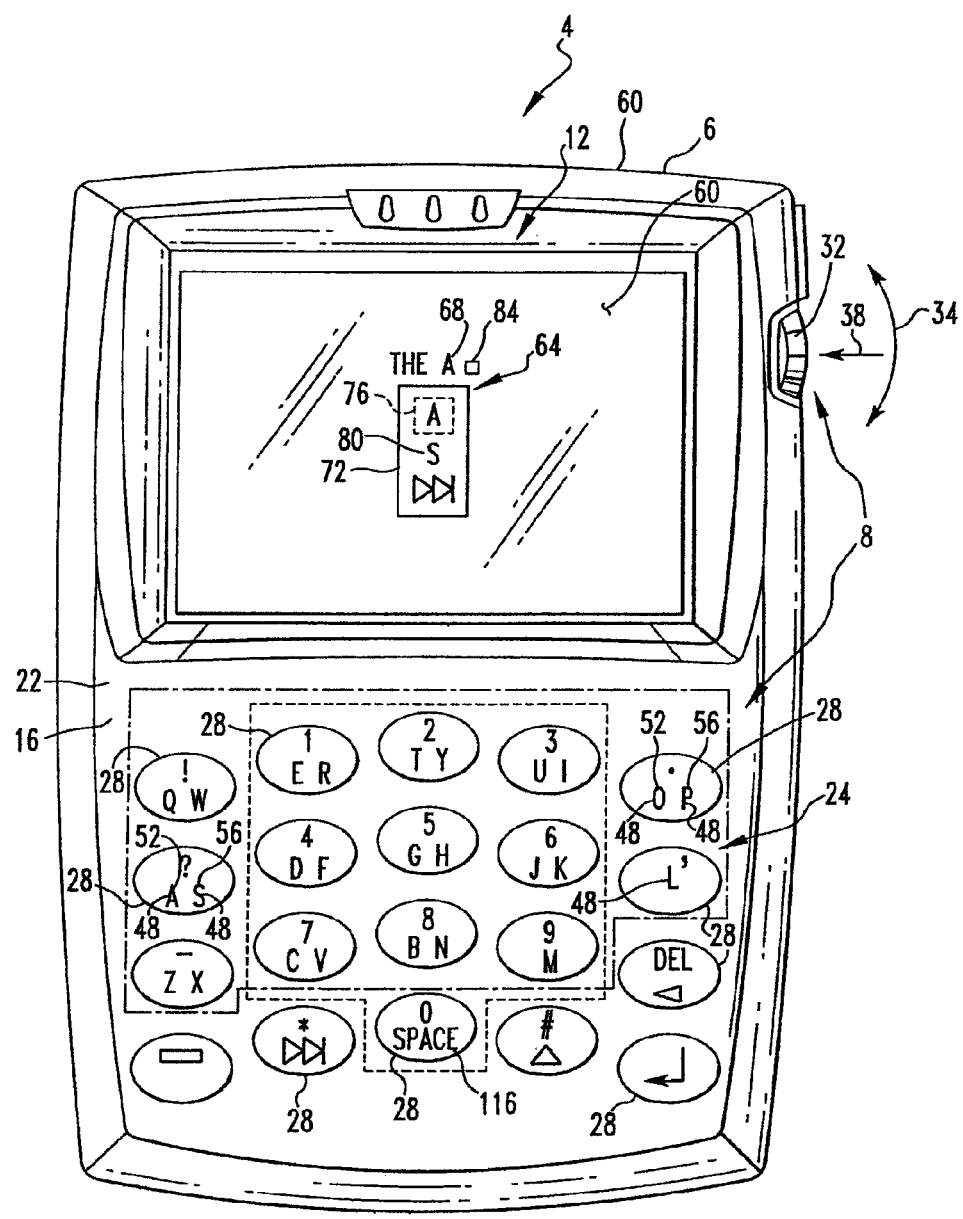
FIG. 1 is a top plan view of an improved handheld electronic device in accordance with the disclosed and claimed concept.
Figure 2:
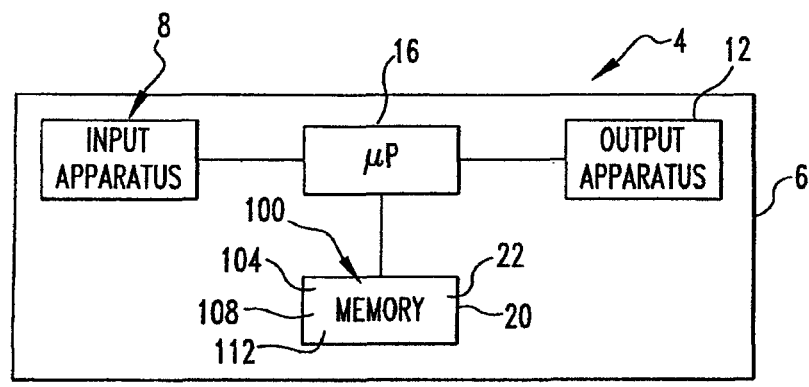
FIG. 2 is a schematic depiction of the improved handheld electronic device of FIG. 1.

An improved handheld electronic device 4 is indicated generally in FIG. 1 and is depicted schematically in FIG. 2. The exemplary handheld electronic device 4 includes a housing 6 upon which are disposed a processor unit that includes an input apparatus 8, an output apparatus 12, a processor 16, a memory 20, and at least a first routine. The processor 16 may be, for instance, and without limitation, a microprocessor (µP) and is responsive to inputs from the input apparatus 8 and provides output signals to the output apparatus 12. The processor 16 also interfaces with the memory 20. The processor 16 and the memory 20 together form a processor apparatus. Examples of handheld electronic devices are included in U.S. Pat. Nos. 6,452,588 and 6,489,950, which are incorporated by record herein.

As can be understood from FIG. 1, the input apparatus 8 includes a keypad 24 and a thumbwheel 32. As will be described in greater detail below, the keypad 24 is in the exemplary form of a reduced QWERTY keyboard including a plurality of keys 28 that serve as input members. It is noted, however, that the keypad 24 may be of other configurations, such as an AZERTY keyboard, a QWERTZ keyboard, or other keyboard arrangement, whether presently known or unknown, and either reduced or not reduced. As employed herein, the expression "reduced" and variations thereof in the context of a keyboard, a keypad, or other arrangement of input members, shall refer broadly to an arrangement in which at least one of the input members has assigned thereto a plurality of linguistic elements such as, for example, characters in the set of Latin letters, whereby an actuation of the at least one of the input members, without another input in combination therewith, is an ambiguous input since it could refer to more than one of the plurality of linguistic elements assigned thereto. As employed herein, the expression "linguistic element" and variations thereof shall refer broadly to any element that itself can be a language object or from which a language object can be constructed, identified, or otherwise obtained, and thus would include, for example and without limitation, characters, letters, strokes, ideograms, phonemes, morphemes, digits, and the like. As employed herein, the expression "language object" and variations thereof shall refer broadly to any type of object that may be constructed, identified, or otherwise obtained from one or more linguistic elements, that can be used alone or in combination to generate text, and that would include, for example and without limitation, words, shortcuts, symbols, ideograms, and the like.

The system architecture of the handheld electronic device 4 advantageously is organized to be operable independent of the specific layout of the keypad 24. Accordingly, the system architecture of the handheld electronic device 4 can be employed in conjunction with virtually any keypad layout substantially without requiring any meaningful change in the system architecture. It is further noted that certain of the features set forth herein are usable on either or both of a reduced keyboard and a non-reduced keyboard.

The keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16.

As can further be seen in FIG. 1, many of the keys 28 include a number of linguistic elements 48 disposed thereon. As employed herein, the expression "a number of" and variations thereof shall refer broadly to any quantity, including a quantity of one. In the exemplary depiction of the keypad 24, many of the keys 28 include two linguistic elements, such as including a first linguistic element 52 and a second linguistic element 56 assigned thereto.

One of the keys 28 of the keypad 24 includes as the characters 48 thereof the letters "Q" and "W", and an adjacent key 28 includes as the characters 48 thereof the letters "E" and "R.". It can be seen that the arrangement of the characters 48 on the keys 28 of the keypad 24 is generally of a QWERTY arrangement, albeit with many of the keys 28 including two of the characters 48.

The output apparatus 12 includes a display 60 upon which can be provided an output 64. An exemplary output 64 is depicted on the display 60 in FIG. 1. The output 64 includes a text component 68 and a variant component 72. The variant component 72 includes a default portion 76 and a variant portion 80. The display also includes a caret 84 that depicts generally where the next input from the input apparatus 8 will be received.

The text component 68 of the output 64 provides a depiction of the default portion 76 of the output 64 at a location on the display 60 where the text is being input. The variant component 72 is disposed generally in the vicinity of the text component 68 and provides, in addition to the default proposed output 76, a depiction of the various alternate text choices, i.e., alternates to the default proposed output 76, that are proposed by an input disambiguation function in response to an input sequence of key actuations of the keys 28.

As will be described in greater detail below, the default portion 76 is proposed by the disambiguation function as being the most likely disambiguated interpretation of the ambiguous input provided by the user. The variant portion 80 includes a predetermined quantity of alternate proposed interpretations of the same ambiguous input from which the user can select, if desired. It is noted that the exemplary variant portion 80 is depicted herein as extending vertically below the default portion 76, but it is understood that numerous other arrangements could be provided.

Figure 2A:
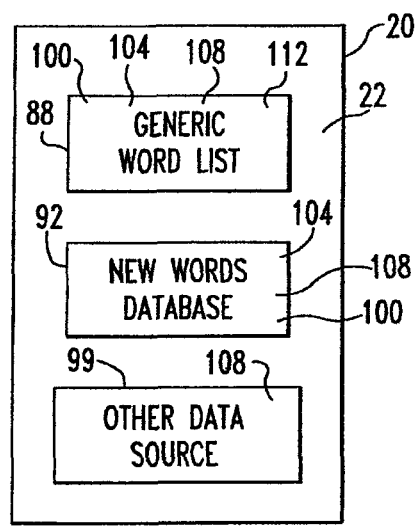
FIG. 2A is a schematic depiction of a portion of the handheld electronic device of FIG. 2.

The memory 20 is depicted schematically in FIG. 2A. The memory 20 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 20 additionally includes a number of routines depicted generally with the numeral 22 for the processing of data. The routines 22 can be in any of a variety of forms such as, without limitation, software, firmware, and the like. As will be explained in greater detail below, the routines 22 include the aforementioned disambiguation function as an application, as well as other routines.

As can be understood from FIG. 2A, the memory 20 additionally includes data stored and/or organized in a number of tables, sets, lists, and/or otherwise. Specifically, the memory 20 includes a generic word list 88, a new words database 92, and a number of other data sources 99. While only a single other data source 99 is depicted in FIG. 2A, it is understood that any quantity of other data sources 99 may be provided and used.

Stored within the various areas of the memory 20 are a number of language objects 100 and frequency objects 104. The language objects 100 generally are each associated with an associated frequency object 104. The language objects 100 include, in the present exemplary embodiment, a plurality of word objects 108 and a plurality of N-gram objects 112. The word objects 108 are generally representative of complete words within the language or custom words stored in the memory 20. For instance, if the language stored in the memory 20 is, for example, English, generally each word object 108 would represent a word in the English language or would represent a custom word.

Associated with substantially each word object 108 is a frequency object 104 having frequency value that is indicative of the relative frequency within the relevant language of the given word represented by the word object 108. In this regard, the generic word list 88 includes a plurality of word objects 108 and associated frequency objects 104 that together are representative of a wide variety of words and their relative frequency within a given vernacular of for instance, a given language. The generic word list 88 can be derived in any of a wide variety of fashions, such as by analyzing numerous texts and other language sources to determine the various words within the language sources as well as their relative probabilities, i.e., relative frequencies, of occurrences of the various words within the language sources.

The N-gram objects 112 stored within the generic word list 88 are short strings of characters within the relevant language typically, for example, one to three characters in length, and typically represent word fragments within the relevant language, although certain of the N-gram objects 112 additionally can themselves be words. However, to the extent that an N-gram object 112 also is a word within the relevant language, the same word likely would be separately stored as a word object 108 within the generic word list 88. As employed herein, the expression "string" and variations thereof shall refer broadly to an object having one or more characters or components, and can refer to any of a complete word, a fragment of a word, a custom word or expression, and the like.

In the present exemplary embodiment of the handheld electronic device 4, the N-gram objects 112 include 1-gram objects, i.e., string objects that are one character in length, 2-gram objects, i.e., string objects that are two characters in length, and 3-gram objects, i.e., string objects that are three characters in length, all of which are collectively referred to as N-grams 112. Substantially each N-gram object 112 in the generic word list 88 is similarly associated with an associated frequency object 104 stored within the generic word list 88, but the frequency object 104 associated with a given N-gram object 112 has a frequency value that indicates the relative probability that the character string represented by the particular N-gram object 112 exists at any location within any word of the relevant language. The N-gram objects 112 and the associated frequency objects 104 are a part of the corpus of the generic word list 88 and are obtained in a fashion similar to the way in which the word object 108 and the associated frequency objects 104 are obtained, although the analysis performed in obtaining the N-gram objects 112 will be slightly different because it will involve analysis of the various character strings within the various words instead of relying primarily on the relative occurrence of a given word.

The present exemplary embodiment of the handheld electronic device 4, with its exemplary language being the English language, includes twenty-six 1-gram N-gram objects 112, i.e., one 1-gram object for each of the twenty-six letters in the Latin alphabet upon which the English language is based, and further includes 676 2-gram N-gram objects 112, i.e., twenty-six squared, representing each two-letter permutation of the twenty-six letters within the Latin alphabet.

The N-gram objects 112 also include a certain quantity of 3-gram N-gram objects 112, primarily those that have a relatively high frequency within the relevant language. The exemplary embodiment of the handheld electronic device 4 includes fewer than all of the three-letter permutations of the twenty-six letters of the Latin alphabet due to considerations of data storage size, and also because the 2-gram N-gram objects 112 can already provide a meaningful amount of information regarding the relevant language. As will be set forth in greater detail below, the N-gram objects 112 and their associated frequency objects 104 provide frequency data that can be attributed to character strings for which a corresponding word object 108 cannot be identified or has not been identified, and typically is employed as a fallback data source, although this need not be exclusively the case.

In the present exemplary embodiment, the language objects 100 and the frequency objects 104 are maintained substantially inviolate in the generic word list 88, meaning that the basic language dictionary remains substantially unaltered within the generic word list 88, and the learning functions that are provided by the handheld electronic device 4 and that are described below operate in conjunction with other objects that are generally stored elsewhere in memory 20, such as, for example, in the new words database 92.

The new words database 92 stores additional word objects 108 and associated frequency objects 104 in order to provide to a user a customized experience in which words and the like that are used relatively more frequently by a user will be associated with relatively higher frequency values than might otherwise be reflected in the generic word list 88. More particularly, the new words database 92 includes word objects 108 that are user-defined and that generally are not found among the word objects 108 of the generic word list 88. Each word object 108 in the new words database 92 has associated therewith an associated frequency object 104 that is also stored in the new words database 92.

Figure 3A:
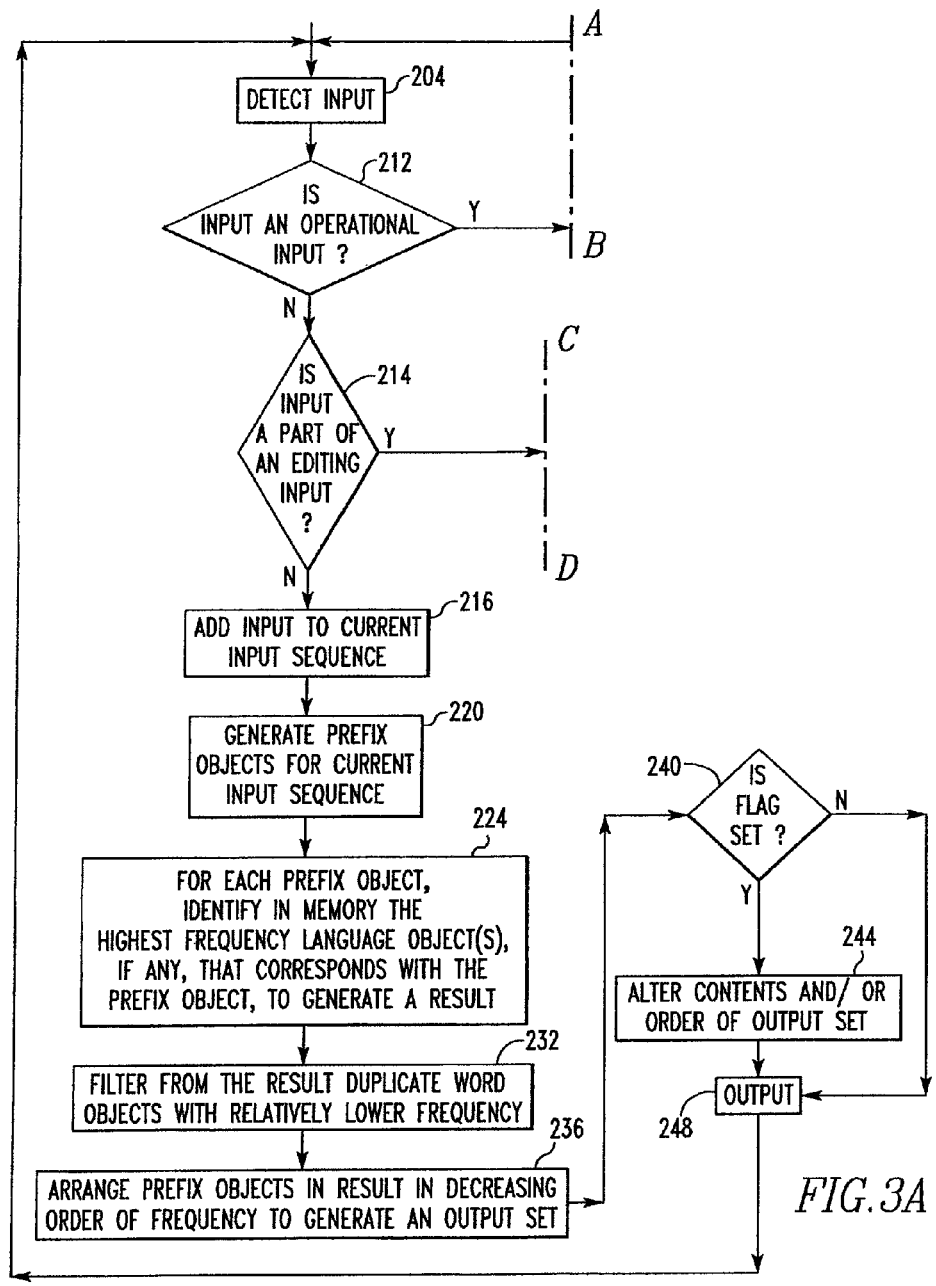
FIGS. 3A, 3B, and 3C are an exemplary flowchart depicting certain aspects of a disambiguation function that can be executed on the handheld electronic device of FIG. 1.
Figure 3B:
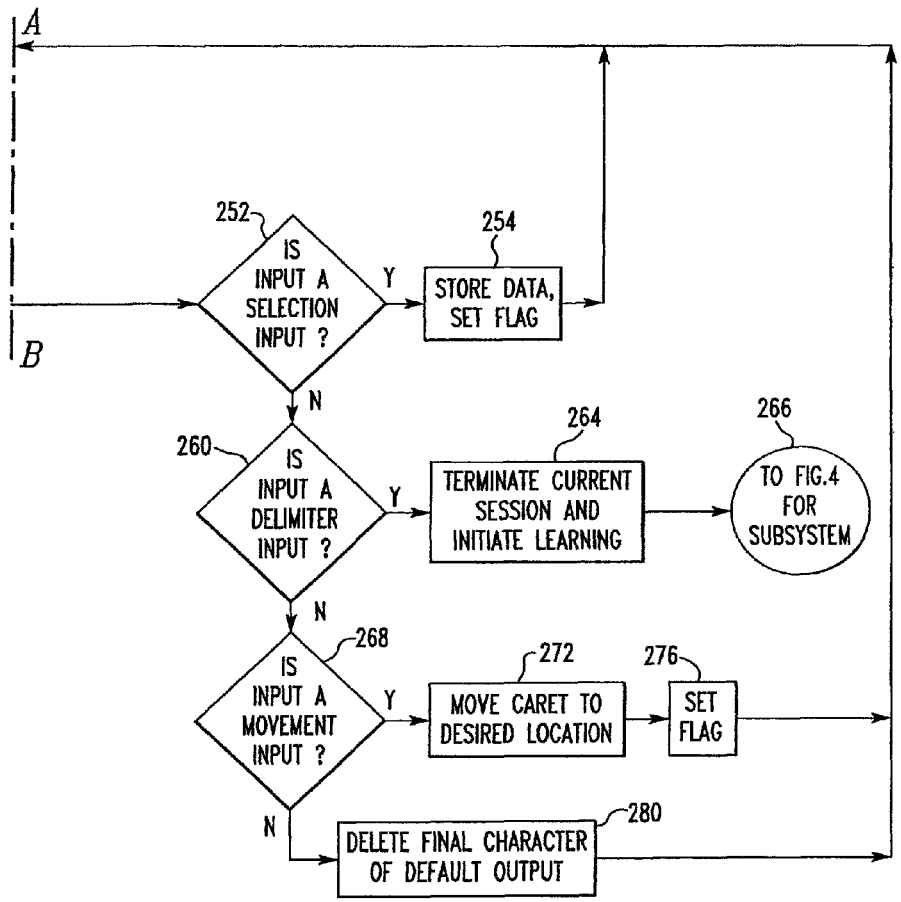
Figure 3C:
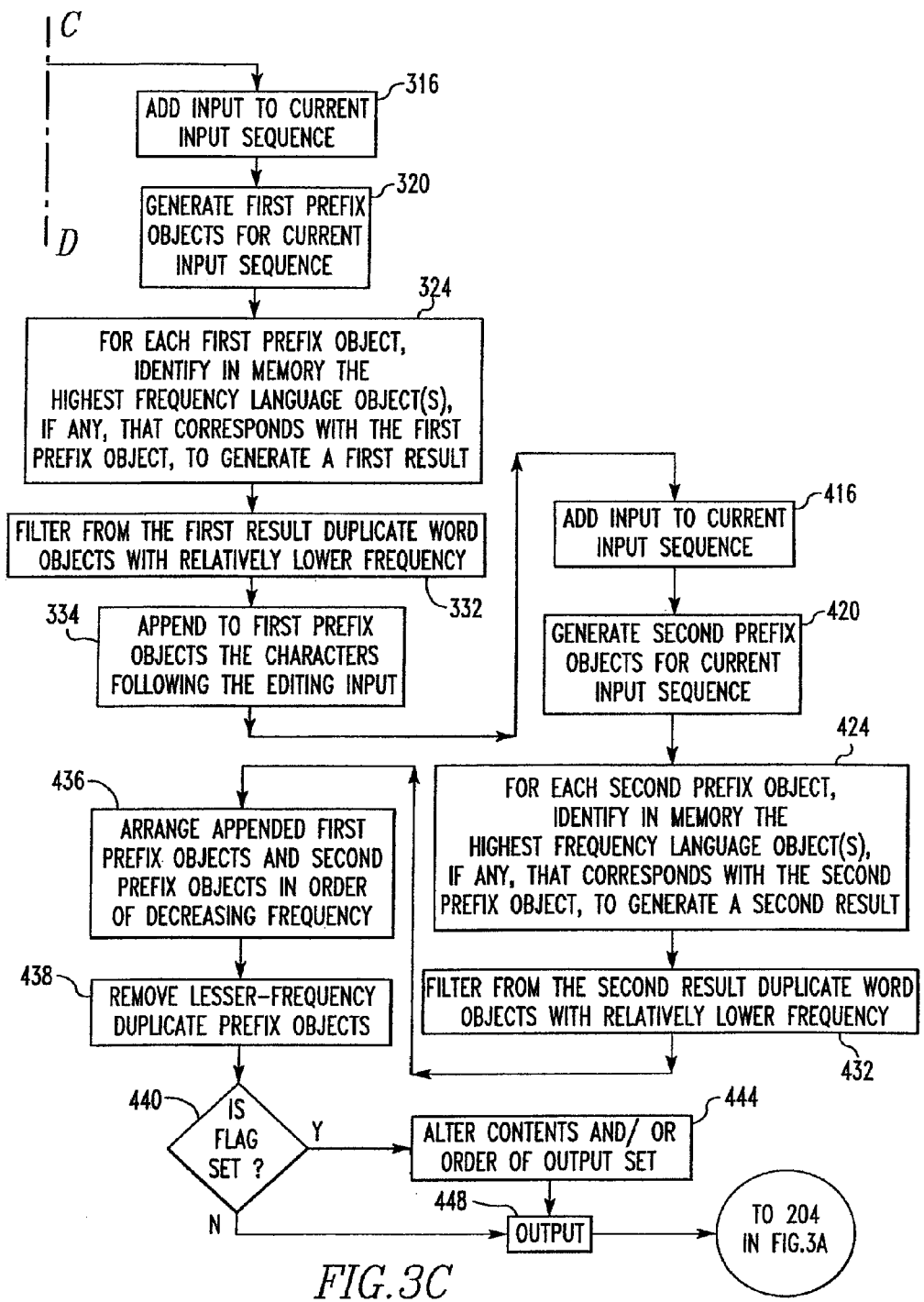

FIGS. 3A, 3B, and 3C depict in an exemplary fashion the general operation of certain aspects of the disambiguation function of the handheld electronic device 4. Additional features, functions, and the like are depicted and described elsewhere.

An input is detected, as at 204, and the input can be any type of actuation or other operation as to any portion of the input apparatus 8. A typical input would include, for instance, an actuation of a key 28 having a number of characters 48 thereon, or any other type of actuation or manipulation of the input apparatus 8.

The disambiguation function then determines, as at 212, whether the current input is an operational input, such as a selection input, a delimiter input, a movement input, an alternation input, or, for instance, any other input that does not constitute an actuation of a key 28 having a number of characters 48 thereon. If the input is determined at 212 to not be an operational input, processing continues at 214 where it is determined whether or not the input is a part of an editing input with respect to a portion of text, such as a word or number of characters that have been output on the display 60. If it is determined that the input is an editing input, processing continues to 316 in FIG. 3C. However, if it is determined that the input is not an editing input, processing continues at 216 by adding the input to the current input sequence which may or may not already include an input.

Many of the inputs detected at 204 are employed in generating input sequences as to which the disambiguation function will be executed. An input sequence is built up in each "session" with each actuation of a key 28 having a number of characters 48 thereon. Since an input sequence typically will be made up of at least one actuation of a key 28 having a plurality of characters 48 thereon, the input sequence will be ambiguous. When a word, for example, is completed the current session is ended and a new session is initiated.

An input sequence is gradually built up on the handheld electronic device 4 with each successive actuation of a key 28 during any given session. Specifically, once a delimiter input is detected during any given session, the session is terminated and a new session is initiated. Each input resulting from an actuation of one of the keys 28 having a number of the characters 48 associated therewith is sequentially added to the current input sequence. As the input sequence grows during a given session, the disambiguation function generally is executed with each actuation of a key 28, i.e., input, and as to the entire input sequence. Stated otherwise, within a given session, the growing input sequence is attempted to be disambiguated as a unit by the disambiguation function with each successive actuation of the various keys 28.

Once a current input representing a most recent actuation of the one of the keys 28 having a number of the characters 48 assigned thereto has been added to the current input sequence within the current session, as at 216 in FIG. 3A, the disambiguation function generates, as at 220, substantially all of the permutations of the characters 48 assigned to the various keys 28 that were actuated in generating the input sequence. In this regard, the "permutations" refer to the various strings that can result from the characters 48 of each actuated key 28 limited by the order in which the keys 28 were actuated. The various permutations of the characters in the input sequence are employed as prefix objects.

For instance, if the current input sequence within the current session is the ambiguous input of the keys "AS" and "OP", the various permutations of the first character 52 and the second character 56 of each of the two keys 28, when considered in the sequence in which the keys 28 were actuated, would be "SO", "SP", "AP", and "AO", and each of these is a prefix object that is generated, as at 220, with respect to the current input sequence. As will be explained in greater detail below, the disambiguation function seeks to identify for each prefix object one of the word objects 108 for which the prefix object would be a prefix.

For each generated prefix object, the memory 20 is consulted, as at 224, to identify, if possible, for each prefix object one of the word objects 108 in the memory 20 that corresponds with the prefix object, meaning that the sequence of letters represented by the prefix object would be either a prefix of the identified word object 108 or would be substantially identical to the entirety of the word object 108. Further in this regard, the word object 108 that is sought to be identified is the highest frequency word object 108. That is, the disambiguation function seeks to identify the word object 108 that corresponds with the prefix object and that also is associated with a frequency object 104 having a relatively higher frequency value than any of the other frequency objects 104 associated with the other word objects 108 that correspond with the prefix object.

It is noted in this regard that the word objects 108 in the generic word list 88 are generally organized in data tables that correspond with the first two letters of various words. For instance, the data table associated with the prefix "CO" would include all of the words such as "CODE", "COIN", "COMMUNICATION", and the like. Depending upon the quantity of word objects 108 within any given data table, the data table may additionally include sub-data tables within which word objects 108 are organized by prefixes that are three characters or more in length. Continuing onward with the foregoing example, if the "CO" data table included, for instance, more than 256 word objects 108, the "CO" data table would additionally include one or more sub-data tables of word objects 108 corresponding with the most frequently appearing three-letter prefixes. By way of example, therefore, the "CO" data table may also include a "COM" sub-data table and a "CON" sub-data table. If a sub-data table includes more than the predetermined number of word objects 108, for example a quantity of 256, the sub-data table may include further sub-data tables, such as might be organized according to four-letter prefixes. It is noted that the aforementioned quantity of 256 of the word objects 108 corresponds with the greatest numerical value that can be stored within one byte of the memory 20.

Accordingly, when, at 224, each prefix object is sought to be used to identify a corresponding word object 108, and for instance the instant prefix object is "AP", the "AP" data table will be consulted. Since all of the word objects 108 in the "AP" data table will correspond with the prefix object "AP", the word object 108 in the "AP" data table with which is associated a frequency object 104 having a frequency value relatively higher than any of the other frequency objects 104 in the "AP" data table is identified. The identified word object 108 and the associated frequency object 104 are then stored in a result register that serves as a result of the various comparisons of the generated prefix objects with the contents of the memory 20.

It is noted that one or more, or possibly all, of the prefix objects will be prefix objects for which a corresponding word object 108 is not identified in the memory 20. Such prefix objects are considered to be orphan prefix objects and are separately stored or are otherwise retained for possible future use. In this regard, it is noted that many or all of the prefix objects can become orphan objects if, for instance, the user is trying to enter a new word or, for example, if the user has mis-keyed and no word corresponds with the mis-keyed input.

Processing continues, as at 232, where duplicate word objects 108 associated with relatively lower frequency values are deleted from the result. Such a duplicate word object 108 could be generated, for instance, by the other data source 99.

Once the duplicate word objects 108 and the associated frequency objects 104 have been removed at 232, processing continues to 236 wherein the remaining prefix objects are arranged in an output set in decreasing order of frequency value.

If it is determined, as at 240, that the flag has been set, meaning that a user has made a selection input, either through an express selection input or through an alternation input of a movement input, then the default output 76 is considered to be "locked," meaning that the selected variant will be the default prefix until the end of the session. If it is determined at 240 that the flag has been set, the processing will proceed to 244 where the contents of the output set will be altered, if needed, to provide as the default output 76 an output that includes the selected prefix object, whether it corresponds with a word object 108 or is an artificial variant. In this regard, it is understood that the flag can be set additional times during a session, in which case the selected prefix associated with resetting of the flag thereafter becomes the "locked" default output 76 until the end of the session or until another selection input is detected.

Processing then continues, as at 248, to an output step after which an output 64 is generated as described above. Processing thereafter continues at 204 where additional input is detected. On the other hand, if it is determined at 240 that the flag had not been set, then processing goes directly to 248 without the alteration of the contents of the output set at 244.

If at 214 it was determined that the input was a part of an editing input, such as might occur during an editing operation on an existing word or on a number of characters that are already output on the display, the disambiguation routine 22 advantageously performs a plurality of disambiguation analyzes. This most particularly occurs if an editing input is detected at a location preceding one or more characters that have already been displayed. In the exemplary embodiment depicted herein, the language being employed is the English language, which reads in a left-to-right direction, and thus the word "preceding" would refer to being to the left of existing characters. It is understood, however, that in a language that reads in a right-to-left direction, for instance, the expression "preceding" would refer to being to the right of existing characters, and it is further understood that in a language that reads in a top-to-bottom direction, for instance, the expression "preceding" would refer to being above existing characters.

The disambiguation routine 22 will perform a first disambiguation analysis on the editing input itself, which may comprise one or more input member actuations. The disambiguation routine will also perform a second disambiguation analysis on the editing input in combination with the existing word or number of characters that have already, i.e., previously, been displayed. The results of the two disambiguation operations are combined in a single list and are output in order of decreasing frequency value. In essence, the disambiguation routine 22 recognizes that the additional input member actuations, being at a location directly preceding one or more other characters, might be a part of a new separate word that is being inserted in front of the existing word or number of characters, or the additional input member actuations be intended to be a number of additional characters preceding the pre-existing characters and which might result in the formation of a larger word comprising the pre-existing characters.

Figure 9:
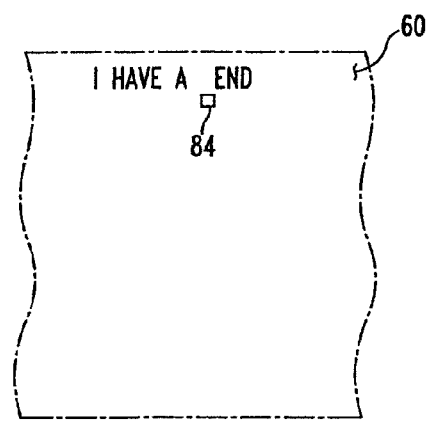
FIG. 9 is an exemplary output during another text entry operation.
Figure 10:
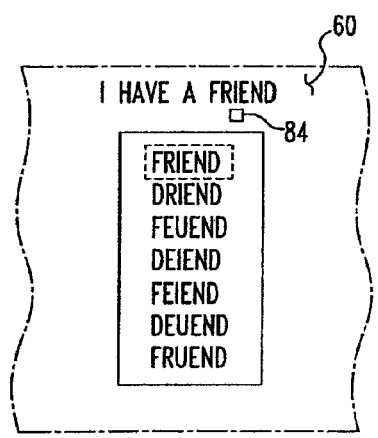
FIG. 10 is another exemplary output during another part of the other text entry operation.

Such an operation is described in relation to the portion of the flowchart depicted generally in FIG. 3C, and an example is depicted generally in FIGS. 9-10. Regarding the brief example, it is noted that FIG. 9 depicts the word "END" having already been output on the display 60, and the caret 84 having been moved to a position immediately preceding the word "END". If a user then actuated the input members <DF><ER><UI> as an ambiguous editing input, the disambiguation routine would perform a disambiguation operation on the ambiguous editing input itself, i.e., the input member actuations <DF><ER><UI> without the additional characters "END". That is, the first prefix objects DEI, DEU, DRI, DRU, FEI, FEU, FRI, and FRU would be created from the editing input <DF><ER><UI>, and language objects 100 corresponding with each of the prefix objects would be sought. For instance, the language object 100 for "drip" might be identified as corresponding with the prefix object "DRI", and the language object 100 for "drum" might be identified as corresponding with the prefix object "DRU". Other such language objects 100 likely will be identified as corresponding with these and the other prefix objects. Frequency values from the identified language objects 100 would be associated with the various first prefix objects DEI, DEU, DRI, DRU, FEI, FEU, FRI, and FRU.

The disambiguation routine would also perform a disambiguation operation on the ambiguous editing input in combination with the existing characters "END". That is, the various characters permutations from the input member actuations <DF><ER><UI> in combination with the existing characters "END" would be created. Thus, the second prefix objects would be DEIEND, DEUEND, DRIEND, DRUEND, FEIEND, FEUEND, FRIEND, and FRUEND, for example. For each such second prefix object, the disambiguation routine 22 would seek language objects 100 that correspond with the prefix object. For the example given, if it is assumed that the relevant language is the English language, likely the only prefix object for which a corresponding word object 108 would be found would be the language object 100 for the complete word "FRIEND". It is possible that N-gram objects 112 could be identified in order to associate a frequency value with the other prefix objects, although the frequency values associated with such prefix objects would be substantially less than the frequency value associate with the prefix object "FRIEND". In any event, frequency values, as appropriate, would be associated with the various second prefix objects DEIEND, DEUEND, DRIEND, DRUEND, FEIEND, FEUEND, FRIEND, and FRUEND.

Since the preexisting output characters "END" are considered in the current editing analysis to be committed, i.e., locked, the characters "END" are appended to each of the first prefix object generated from the editing input. That is, the first prefix objects DEI, DEU, DRI, DRU, FEI, FEU, FRI, and FRU, which were mentioned above in connection with the first of the two exemplary disambiguation operations being described, and with which frequency values were associated, would become "appended" first prefix objects, thus DEIEND, DEUEND, DRIEND, DRUEND, FEIEND, FEUEND, FRIEND, and FRUEND.

The frequency values associated with the second prefix objects DEIEND, DEUEND, DRIEND, DRUEND, FEIEND, FEUEND, FRIEND, and FRUEND and the frequency values of the "appended" first prefix objects DEIEND, DEUEND, DRIEND, DRUEND, FEIEND, FEUEND, FRIEND, and FRUEND would then be compared, and the prefix objects arranged in an output set in order of decreasing frequency value. Lesser frequency value duplicate prefix objects would be removed.

For instance, and as can be seen from FIG. 3C, the current input would be added to the editing input sequence at 316. In the present example, if the input <UI> would be added to the existing editing input sequence to create the current editing input <DF><ER><UI>. Prefix objects for the editing input would be generated at 320 which, in the present example, would be the first prefix objects DEI, DEU, DRI, DRU, FEI, FEU, FRI, and FRU. At 324, language objects 100 would be sought for correspondence with each first prefix object. Any duplicate language objects 100 with relatively lower frequency values would be filtered at 332.

At 334, the locked characters "END" would be appended to each of the first prefix objects DEI, DEU, DRI, DRU, FEI, FEU, FRI, and FRU, thus forming the "appended" first prefix objects DEIEND, DEUEND, DRIEND, DRUEND, FEIEND, FEUEND, FRIEND, and FRUEND. Appending of the characters "END" that follow these prefix objects to form the "appended" first prefixes enables these first prefix objects to be compared with the prefix objects that will be generated in a second disambiguation operation, as will be set forth in greater detail below.

Specifically, the second disambiguation operation would commence at 416. For instance, the current input would be added to the editing input sequence at 416 and to the pre-existing word "END". In the present example, if the input <UI> would be added to the existing editing input sequence to create the current editing input <DF><ER><UI>, and would be combined with the characters "END". Second prefix objects for the editing input in combination with the pre-existing characters "END" would be generated at 420 which, in the present example, would be the second prefix objects DEIEND, DEUEND, DRIEND, DRUEND, FEIEND, FEUEND, FRIEND, and FRUEND. At 424, language objects 100 would be sought for correspondence with each such second prefix object. In the example presented herein, the only word object 108 found as corresponding with any of the second prefix objects would be the word object 108 for the complete word "FRIEND". Any duplicate language objects 100 with relatively lower frequency values would be filtered at 432.

The "appended" first prefix objects DEIEND, DEUEND, DRIEND, DRUEND, FEIEND, FEUEND, FRIEND, and FRUEND, with associate frequency values, and the second prefix objects DEIEND, DEUEND, DRIEND, DRUEND, FEIEND, FEUEND, FRIEND, and FRUEND, with associated frequency values, would be arranged at 436 in an output list in order of decreasing frequency value. Lesser-frequency duplicate prefix objects would then be removed at 438.

In this regard, it is noted that by appending "END" to the first prefix objects to form the "appended" first prefix objects, the "appended" first prefix objects DEIEND, DEUEND, DRIEND, DRUEND, FEIEND, FEUEND, FRIEND, and FRUEND, are the same as the second prefix objects DEIEND, DEUEND, DRIEND, DRUEND, FEIEND, FEUEND, FRIEND, and FRUEND. However, it is noted that the frequency values associated with the appended first prefix objects are those that were obtained by performing a disambiguation analysis on the first prefix objects DEI, DEU, DRI, DRU, FEI, FEU, FRI, and FRU, whereas the frequency values associated with the second prefix objects were obtained from performing the disambiguation analysis on the second prefix objects DEIEND, DEUEND, DRIEND, DRUEND, FEIEND, FEUEND, FRIEND, and FRUEND. Transforming the first prefix objects into "appended" first prefix objects enables lower-frequency duplicate appended first prefix objects and/or second prefix objects to be removed from the output list. It also enables, as set forth below, the outputting of variants that are all of the same length. This advantageously enables the user to receive the best possible disambiguation analysis with respect to the text being edited.

If it is determined, as at 440, that the flag has been set, then the default output 76 is considered to be "locked," in a fashion similar to that set forth above at 240, and processing will proceed to 444 where the contents of the output set will be altered, if needed. Processing then continues, as at 448, to an output step after which an output 64 is generated as described above. Processing thereafter continues at 204 where additional input is detected. On the other hand, if it is determined at 440 that the flag had not been set, then processing goes directly to 448 without the alteration of the contents of the output set at 444.

It is noted that if either a first or a second prefix object is identified as being a complete word, such prefix object is output as the default output. If, for instance, both a first prefix object and a second prefix object are identified as being complete words, the two are output at the top of the selection list, with the one having the higher frequency value associated therewith being output as the default, and with the other being the first variant output. Such a complete word prefix object will, if necessary, be output with any pre-existing trailing characters being appended.

It is also noted that any characters preceding the editing input are considered to be locked and considered to be a part of the editing input. For instance, if instead of the word "END" being the pre-existing word, the preexisting word was "SEND", and the caret 84 provided the editing input immediately preceding the "E" and immediately following the "S" in "SEND". The first prefix objects would be SDEI, SDEU, SDRI, SDRU, SFEI, SFEU, SFRI, and SFRU, and corresponding language objects 100 would be sought. The "appended" first prefix objects would be SDEIEND, SDEUEND, SDRIEND, SDRUEND, SFEIEND, SFEUEND, SFRIEND, and SFRUEND, with the END portion being appended after language objects 100 were identified and frequency values associated with the first prefix objects. The second prefix objects would be SDEIEND, SDEUEND, SDRIEND, SDRUEND, SFEIEND, SFEUEND, SFRIEND, and SFRUEND, and corresponding language objects 100 would be sought for each.

If the detected input is determined, as at 212, to be an operational input, processing then continues to determine the specific nature of the operational input. For instance, if it is determined, as at 252, that the current input is a selection input, processing continues at 254 where the flag is set. Processing then returns to detection of additional inputs as at 204.

Figure 4:
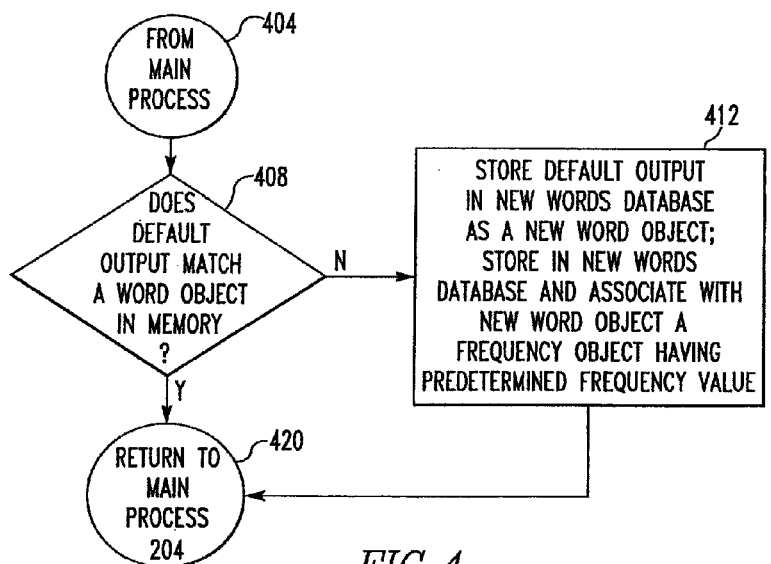
FIG. 4 is another exemplary flowchart depicting certain aspects of a learning method that can be executed on the handheld electronic device.

If it is determined, as at 260, that the input is a delimiter input, processing continues at 264 where the current session is terminated and processing is transferred, as at 266, to the learning function subsystem, as at 404 of FIG. 4. A delimiter input would include, for example, the actuation of a <SPACE> key 116, which would both enter a delimiter symbol and would add a space at the end of the word, actuation of the <ENTER> key, which might similarly enter a delimiter input and enter a space, and by a translation of the thumbwheel 32, such as is indicated by the arrow 38, which might enter a delimiter input without additionally entering a space.

It is first determined, as at 408, whether the default output at the time of the detection of the delimiter input at 260 matches a word object 108 in the memory 20. If it does not, this means that the default output is a user-created output that should be added to the new words database 92 for future use. In such a circumstance processing then proceeds to 412 where the default output is stored in the new words database 92 as a new word object 108. Additionally, a frequency object 104 is stored in the new words database 92 and is associated with the aforementioned new word object 108. The new frequency object 104 is given a relatively high frequency value, typically within the upper one-fourth or one-third of a predetermined range of possible frequency values.

In this regard, frequency objects 104 are given an absolute frequency value generally in the range of zero to 65,535. The maximum value represents the largest number that can be stored within two bytes of the memory 20. The new frequency object 104 that is stored in the new words database 92 is assigned an absolute frequency value within the upper one-fourth or one-third of this range, particularly since the new word was used by a user and is likely to be used again.

With further regard to frequency object 104, it is noted that within a given data table, such as the "CO" data table mentioned above, the absolute frequency value is stored only for the frequency object 104 having the highest frequency value within the data table. All of the other frequency objects 104 in the same data table have frequency values stored as percentage values normalized to the aforementioned maximum absolute frequency value. That is, after identification of the frequency object 104 having the highest frequency value within a given data table, all of the other frequency objects 104 in the same data table are assigned a percentage of the absolute maximum value, which represents the ratio of the relatively smaller absolute frequency value of a particular frequency object 104 to the absolute frequency value of the aforementioned highest value frequency object 104. Advantageously, such percentage values can be stored within a single byte of memory, thus saving storage space within the handheld electronic device 4.

Upon creation of the new word object 108 and the new frequency object 104, and storage thereof within the new words database 92, processing is transferred to 420 where the learning process is terminated. Processing is then returned to the main process, as at 204. If at 408 it is determined that the word object 108 in the default output 76 matches a word object 108 within the memory 20, processing is returned directly to the main process at 204.

With further regard to the identification of various word objects 108 for correspondence with generated prefix objects, it is noted that the memory 20 can include a number of additional data sources 99 in addition to the generic word list 88 and the new words database 92, all of which can be considered linguistic sources. It is understood that the memory 20 might include any number of other data sources 99. The other data sources 99 might include, for example, an address database, a speed-text database, or any other data source without limitation. An exemplary speed-text database might include, for example, sets of words or expressions or other data that are each associated with, for example, a character string that may be abbreviated. For example, a speed-text database might associate the string "br" with the set of words "Best Regards", with the intention that a user can type the string "br" and receive the output "Best Regards".

In seeking to identify word objects 108 that correspond with a given prefix object, the handheld electronic device 4 may poll all of the data sources in the memory 20. For instance the handheld electronic device 4 may poll the generic word list 88, the new words database 92, and the other data sources 99 to identify word objects 108 that correspond with the prefix object. The contents of the other data sources 99 may be treated as word objects 108, and the processor 16 may generate frequency objects 104 that will be associated with such word objects 108 and to which may be assigned a frequency value in, for example, the upper one-third or one-fourth of the aforementioned frequency range. Assuming that the assigned frequency value is sufficiently high, the string "br", for example, would typically be output to the display 60. If a delimiter input is detected with respect to the portion of the output having the association with the word object 108 in the speed-text database, for instance "br", the user would receive the output "Best Regards", it being understood that the user might also have entered a selection input as to the exemplary string "br".

The contents of any of the other data sources 99 may be treated as word objects 108 and may be associated with generated frequency objects 104 having the assigned frequency value in the aforementioned upper portion of the frequency range. After such word objects 108 are identified, the new word learning function can, if appropriate, act upon such word objects 108 in the fashion set forth above.

If it is determined, such as at 268, that the current input is a movement input, such as would be employed when a user is seeking to edit an object, either a completed word or a prefix object within the current session, the caret 84 is moved, as at 272, to the desired location, and the flag is set, as at 276. Processing then returns to where additional inputs can be detected, as at 204.

In this regard, it is understood that various types of movement inputs can be detected from the input device 8. For instance, a rotation of the thumbwheel 32, such as is indicated by the arrow 34 of FIG. 1, could provide a movement input. In the instance where such a movement input is detected, such as in the circumstance of an editing input, the movement input is additionally detected as a selection input. Accordingly, and as is the case with a selection input such as is detected at 252, the selected variant is effectively locked with respect to the default portion 76 of the output 64. Any default output 76 during the same session will necessarily include the previously selected variant.

In the present exemplary embodiment of the handheld electronic device 4, if it is determined, as at 252, that the input is not a selection input, and it is determined, as at 260, that the input is not a delimiter input, and it is further determined, as at 268, that the input is not a movement input, in the current exemplary embodiment of the handheld electronic device 4 the only remaining operational input generally is a detection of the <DELETE> key 86 of the keys 28 of the keypad 24. Upon detection of the <DELETE> key 86, the final character of the default output is deleted, as at 280. Processing thereafter returns to 204 where additional input can be detected.

An exemplary input sequence is depicted in FIGS. 1 and 5-8. In this example, the user is attempting to enter the word "APPLOADER", and this word presently is not stored in the memory 20. In FIG. 1 the user has already typed the "AS" key 28. Since the data tables in the memory 20 are organized according to two-letter prefixes, the contents of the output 64 upon the first keystroke are obtained from the N-gram objects 112 within the memory. The first keystroke "AS" corresponds with a first N-gram object 112 "S" and an associated frequency object 104, as well as another N-gram object 112 "A" and an associated frequency object 104. While the frequency object 104 associated with "S" has a frequency value greater than that of the frequency object 104 associated with "A", it is noted that "A" is itself a complete word. A complete word is always provided as the default output 76 in favor of other prefix objects that do not match complete words, regardless of associated frequency value. As such, in FIG. 1, the default portion 76 of the output 64 is "A".

Figure 5:
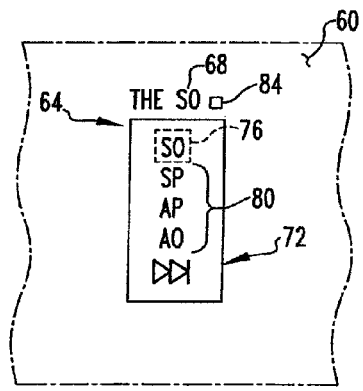
FIG. 5 is an exemplary output during a text entry operation.
Figure 6:
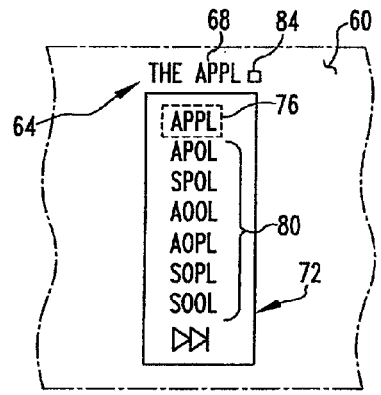
FIG. 6 is another exemplary output during another part of the text entry operation.

In FIG. 5, the user has additionally entered the "OP" key 28. The variants are depicted in FIG. 5. Since the prefix object "SO" is also a word, it is provided as the default output 76. In FIG. 6, the user has again entered the "OP" key 28 and has also entered the "L" key 28. It is noted that the exemplary "L" key 28 depicted herein includes only the single character 48 "L".

It is assumed in the instant example that no operational inputs have thus far been detected. The default output 76 is "APPL", such as would correspond with the word "APPLE". The prefix "APPL" is depicted both in the text component 68, as well as in the default portion 76 of the variant component 72. Variant prefix objects in the variant portion 80 include "APOL", such as would correspond with the word "APOLOGIZE", and the prefix "SPOL", such as would correspond with the word "SPOLIATION".

It is particularly noted that the additional variants "AOOL", "AOPL", "SOPL", and "SOOL" are also depicted as variants 80 in the variant component 72. Since no word object 108 corresponds with these prefix objects, the prefix objects are considered to be orphan prefix objects for which a corresponding word object 108 was not identified. In this regard, it may be desirable for the variant component 72 to include a specific quantity of entries, and in the case of the instant exemplary embodiment the quantity is seven entries. Upon obtaining the result at 224, if the quantity of prefix objects in the result is fewer than the predetermined quantity, the disambiguation function will seek to provide additional outputs until the predetermined number of outputs are provided.

Figure 7:
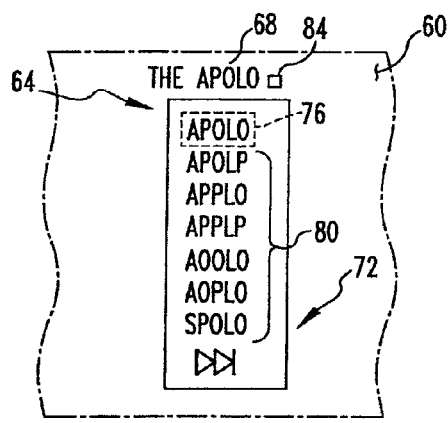
FIG. 7 is another exemplary output during another part of the text entry operation.

In FIG. 7 the user has additionally entered the "OP" key 28. In this circumstance, and as can be seen in FIG. 7, the default portion 76 of the output 64 has become the prefix object "APOLO" such as would correspond with the word "APOLOGIZE", whereas immediately prior to the current input the default portion 76 of the output 64 of FIG. 6 was "APPL" such as would correspond with the word "APPLE." Again, assuming that no operational inputs had been detected, the default prefix object in FIG. 7 does not correspond with the previous default prefix object of FIG. 6. As such, a first artificial variant "APOLP" is generated and in the current example is given a preferred position. The aforementioned artificial variant "APOLP" is generated by deleting the final character of the default prefix object "APOLO" and by supplying in its place an opposite character 48 of the key 28 which generated the final character of the default portion 76 of the output 64, which in the current example of FIG. 7 is "P", so that the aforementioned artificial variant is "APOLP".

Furthermore, since the previous default output "APPL" corresponded with a word object 108, such as the word object 108 corresponding with the word "APPLE", and since with the addition of the current input the previous default output "APPL" no longer corresponds with a word object 108, two additional artificial variants are generated. One artificial variant is "APPLP" and the other artificial variant is "APPLO", and these correspond with the previous default output "APPL" plus the characters 48 of the key 28 that was actuated to generate the current input. These artificial variants are similarly output as part of the variant portion 80 of the output 64.

As can be seen in FIG. 7, the default portion 76 of the output 64 "APOLO" no longer seems to match what would be needed as a prefix for "APPLOADER", and the user likely anticipates that the desired word "APPLOADER" is not already stored in the memory 20. As such, the user provides a selection input, such as by scrolling with the thumbwheel 32 until the variant string "APPLO" is highlighted. The user then continues typing and enters the "AS" key.

Figure 8:
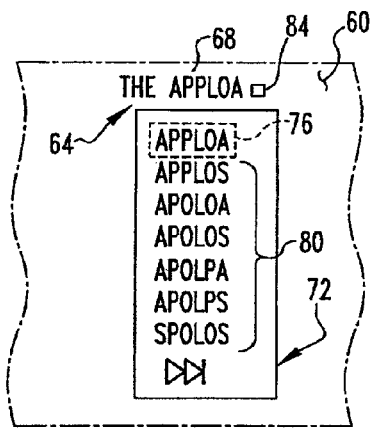
FIG. 8 is another exemplary output during another part of the text entry operation.

The output 64 of such action is depicted in FIG. 8. Here, the string "APPLOA" is the default portion 76 of the output 64. Since the variant string "APPLO" became the default portion 76 of the output 64 (not expressly depicted herein) as a result of the selection input as to the variant string "APPLO", and since the variant string "APPLO" does not correspond with a word object 108, the character strings "APPLOA" and "APPLOS" were created as artificial variants. Additionally, since the previous default of FIG. 7, "APOLO" previously had corresponded with a word object 108, but now is no longer in correspondence with the default portion 76 of the output 64 of FIG. 8, the additional artificial variants of "APOLOA" and "APOLOS" were also generated. Such artificial variants are given a preferred position in favor of the three displayed orphan prefix objects.

Since the current input sequence in the example no longer corresponds with any word object 108, the portions of the method related to attempting to find corresponding word objects 108 are not executed with further inputs for the current session. That is, since no word object 108 corresponds with the current input sequence, further inputs will likewise not correspond with any word object 108. Avoiding the search of the memory 20 for such nonexistent word objects 108 saves time and avoids wasted processing effort.

As the user continues to type, the user ultimately will successfully enter the word "APPLOADER" and will enter a delimiter input. Upon detection of the delimiter input after the entry of "APPLOADER", the learning function is initiated. Since the word "APPLOADER" does not correspond with a word object 108 in the memory 20, a new word object 108 corresponding with "APPLOADER" is generated and is stored in the new words database 92, along with a corresponding new frequency object 104 which is given an absolute frequency in the upper, say, one-third or one-fourth of the possible frequency range. In this regard, it is noted that the new words database 92 is generally organized in two-character prefix data tables similar to those found in the generic word list 88. As such, the new frequency object 104 is initially assigned an absolute frequency value, but upon storage the absolute frequency value, if it is not the maximum value within that data table, will be changed to include a normalized frequency value percentage normalized to whatever is the maximum frequency value within that data table.

It is noted that the layout of the characters 48 disposed on the keys 28 in FIG. 1 is an exemplary character layout that would be employed where the intended primary language used on the handheld electronic device 4 was, for instance, English. Other layouts involving these characters 48 and/or other characters can be used depending upon the intended primary language and any language bias in the makeup of the language objects 100.

As mentioned elsewhere herein, a complete word that is identified during a disambiguation cycle is always provided as a default output 76 in favor of other prefix objects that do not match complete words, regardless of associated frequency value. That is, a word object 108 corresponding with an ambiguous input and having a length equal to that of the ambiguous input is output at a position of priority over other prefix objects. As employed herein, the expression "length" and variations thereof shall refer broadly to a quantity of elements of which an object is comprised, such as the quantity of linguistic elements of which a language object 100 is comprised.

If more than one complete word is identified during a disambiguation cycle, all of the complete words may be output in order of decreasing frequency with respect to one another, with each being at a position of priority over the prefix objects that are representative of incomplete words. However, it may be desirable in certain circumstances to employ additional data, if available, to prioritize the complete words in a way more advantageous to the user.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input into a handheld electronic device of a type comprising an input apparatus, an output apparatus, and a processor apparatus that comprises a memory having a plurality of language objects, the method comprising:
   providing, by the handheld electronic device, as a first output a number of linguistic elements;
   detecting as an ambiguous editing input a number of input key selections at a location that precedes at least a portion of the first output;
   employing a number of language objects that each correspond to at least a portion of the ambiguous editing input in combination with at least one of the linguistic elements of the at least a portion of the first output to generate a number of linguistic results; and
   outputting at least one of the linguistic results.

2. The method of claim 1, wherein the number of language objects is a number of second language objects, and the number of linguistic results is a number of second linguistic results, the method further comprising:
   employing a number of first language objects that each correspond to at least a portion of the ambiguous editing input to generate a number of first linguistic results; and
   outputting at least one of the first linguistic results.

3. The method of claim 2, wherein each of the first language objects and the second language objects has an associated frequency value.

4. The method of claim 2, further comprising:
employing, as the first language objects, a number of language objects that each correspond to at least a portion of the ambiguous editing input in combination with at least one of the linguistic elements of a portion of the first output that precedes the number of input key selections; and
employing, as the second language objects, a number of language objects that each correspond to at least a portion of the ambiguous editing input in combination with at least one of the linguistic elements of the at least a portion of the first output, and further in combination with at least one of the linguistic elements of a portion of the first output that precedes the number of input key selections.

5. The method of claim 2, further comprising outputting the at least one of the first linguistic results having appended thereto at least one of the linguistic elements of the at least a portion of the first output.

6. A handheld electronic device comprising:
an input apparatus;
an output apparatus; and
a processor apparatus that comprises a processor and a memory storing a plurality of language objects, the memory further storing a number of routines which, when executed on the processor, cause the handheld electronic device to perform operations comprising:
providing, by the handheld electronic device, as a first output a number of linguistic elements;
detecting as an ambiguous editing input a number of input key selections at a location that precedes at least a portion of the first output;
employing a number of language objects that each correspond to at least a portion of the ambiguous editing input in combination with at least one of the linguistic elements of the at least a portion of the first output to generate a number of linguistic results; and
outputting at least one of the linguistic results.

7. The handheld electronic device of claim 6, wherein the number of language objects is a number of second language objects, and the number of linguistic results is a number of second linguistic results, the operations further comprising:
employing a number of first language objects that each correspond to at least a portion of the ambiguous editing input to generate a number of first linguistic results; and
outputting at least one of the first linguistic results.

8. The handheld electronic device of claim 7, wherein each of the first language objects and the second language objects has an associated frequency value.

9. The handheld electronic device of claim 7, wherein the operations further comprise outputting the at least one of the first linguistic results having appended thereto at least one of the linguistic elements of the at least a portion of the first output.

* * * * *